United States Patent Office 3,585,118
Patented June 15, 1971

---

3,585,118
PROCESS FOR THE BULK PHOTOCOPOLYMERIZATION OF POLYAMINESULFONES
Susumu Harada and Kunio Arai, Koriyama-shi, Japan, assignors to Nitto Boseki Co., Ltd., Fukushima-shi, Japan
Filed Nov. 13, 1969, Ser. No. 876,386
Claims priority, application Japan, Nov. 18, 1968, 43/83,753
Int. Cl. B01f *11/00;* C08d *1/00;* C08f *1/16*
U.S. Cl. 204—159.22
18 Claims

ABSTRACT OF THE DISCLOSURE

An improved process for producing polyaminesulfones which comprises irradiating an equimolar or substantially equimolar mixture of a diallylamine derivative and sulfur dioxide with a light containing rays having a wave length of 300 to 450 m$\mu$ to bulk-photocopolymerize the mixture. According to this process, polyaminesulfones can easily be obtained in high yields. Since the above-mentioned mixture is a heat-stable, viscous liquid, it can be continuously extruded through a slit or nozzle in the form of a film or sheet and can be continuously polymerized by continuous application of the above-mentioned light. As the said light, there may usually be used sunlight or the light from a fluorescent lamp. The irradiation of light is effected at a temperature ranging from $-100°$ C. to $100°$ C., preferably from $-50°$ C. to $50°$ C.

---

Figure 1:
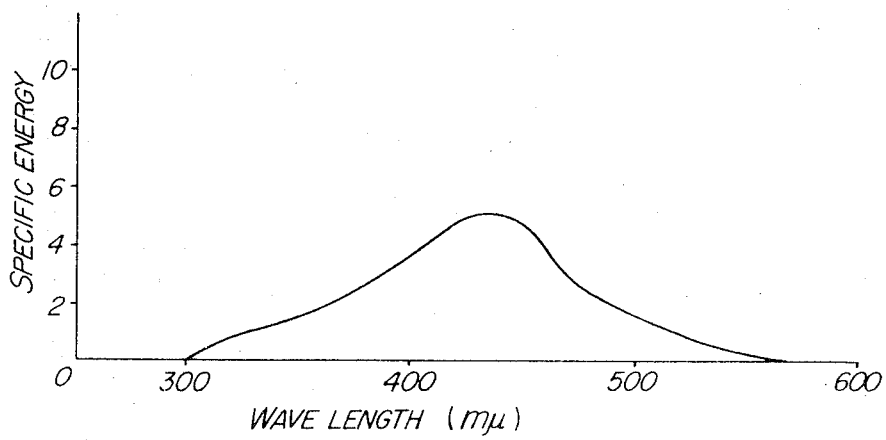

This invention relates to a process for producing polyaminesulfones by subjecting a diallylamine derivative and sulfur dioxide to bulk-photocopolymerization.

More particularly, the invention pertains to a process for preparing polyaminesulfones consisting of repeating units represented by the general Formula II shown below, characterized in that a viscous liquid mixture obtained by mixing a diallylamine derivative represented by the general Formula I shown below with sulfur dioxide in equimolar or substantially equimolar amounts is subjected to bulk-copolymerization by irradiation with a light containing rays having a wave length of 300–450 m$\mu$.

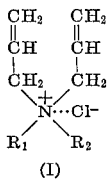
(I)

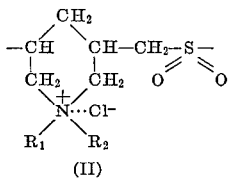
(II)

wherein $R_1$ and $R_2$ are individually a hydrogen atom, an allyl group, a straight or branched chain alkyl group having 1–16 carbon atoms, an aralkyl group or a hydroxyalkyl group [HO$\{CH_2\}_m$, ($m=1$–6)].

Processes for copolymerizing a compound represented by the general Formula I with sulfur dioxide have already been disclosed by the present inventors (Belgian Pat. No. 664,427; U.S. Pat. No. 3,375,233). It has also been found that a compound represented by the general Formula I is cyclically copolymerized by action of light in an excess of liquid sulfur dioxide to give a 1:1 alternating copolymer. Accordingly, the present invention is concerned with an improvement in said processes.

All the copolymerization processes set forth in Belgian Pat. No. 664,427, U.S. Pat. No. 3,375,233 and others are solution-polymerization processes carried out in a solvent. The case where an excess of sulfur dioxide is used is also not exceptional because the excess portion can act as solvent. However, according to solution-polymerization processes, particularly those carried out in an excess of sulfur dioxide, the resulting polyaminesulfones must be separated from the solvent. In processes for producing polymers having a molecular weight over a wide range. According to solution-polymerization processes, however, it is difficult to obtain in high yields polyaminesulfones having an extremely high molecular weight.

As a result of various examinations, the present inventors have found that an oily mixture obtained by mixing a monomer represented by the general Formula I with sulfur dioxide in equimolar or substantially equimolar amounts copolymerizes with extreme ease by application of light to form a polyaminesulfone consisting of repeating units represented by Formula II in a high yield, and also found that according to such a method, there can be produced polyaminesulfones having a low degree of polymerization to a very high degree of polymerization. It is particularly surprising that an equimolar mixture of a monomer represented by the general Formula I and sulfur dioxide is considerably stable, and does not liberate the sulfur dioxide even when heated to $50°$ C. under a reduced pressure of 300 mm. Hg. This suggests that the two compounds have not merely been physically dissolved in each other but have formed a chemical bond. It is considered that a so-called charge transfer complex is formed by mixing said two compounds.

Even when the thus obtained mixture is heated to $100°$ C., no polymerization due to heating takes place. Although a polymerization, of course, takes place if a suitable radical catalyst is added, such a polymerization is not desirable because the control of temperature is extremely difficult. On the other hand, the said equimolar mixture quite easily polymerizes by application of a light having a wave length of from 300 m$\mu$ to 450 m$\mu$. In the case of a polymerization brought about by application of a light, the polymerization terminates when the light is shielded, and therefore the control of temperature is easy. Further, the said equimolar mixture is a viscous liquid, so that when continuously exturded through a slit or nozzle, the mixture maintains the form of a film or a flat sheet, and hence can be continuously polymerized in said state by continuous application of a light. The mixture can, of course, be polymerized even when it is not brought into the form of a film or a flat sheet.

Among the compounds represented by the general Formula I, there is such a compound that when an equimolar mixture of said compound and sulfur dioxide is irradiated with a light, the resulting polyaminesulfone does not dissolve in the monomer mixture but deposits during the polymerization to make the whole system turbid, and there is such a compound that when the same procedure as above is effected, the resulting polyaminesulfone dissolves in the monomer mixture and the polymerization progresses to the last in a transparent homogeneous phase to give a glass-like polyaminesulfone. In the former case, the polyaminesulfone deposits and therefore the product obtained is not so high in polymerization degree. Further, the system becomes turbid, so that the light is difficultly transmitted and the conversion becomes not so high. In the latter case, however, no such problems as mentioned above are brought about, and a polyaminesulfone having an extremely high polymerization degree, for example, an intrinsic viscosity of more than 1.5 as measured at $30°$ C. in N/10 NaCl solution, can be obtained in a high yield. By controlling the polymerization conditions, such as irradiation conditions and polymerization temperature, a polyaminesulfone having a low polymerization degree can easily be obtained. Accordingly compounds particularly suitable for application of the present process are those belonging to the latter case. In such a sense, typical compounds particularly suitable for use in the present process, among the compounds represented by the general Formula I, are:

n-propyl-diallylamine hydrochloride
iso-propyl-diallylamine hydrochloride
n-butyl-diallylamine hydrochloride
tert-butyl-diallylamine hydrochloride
β-hydroxyethyl-diallylamine hydrochloride
diethyl-diallylammonium chloride
methylethyl-diallylammonium chloride
dipropyl-diallylammonium chloride
methylpropyl-diallylammonium chloride
ethylpropyl-diallylammonium chloride
methylbenzyl-diallylammonium chloride
ethylbenzyl-diallylammonium chloride
methyl-β-(hydroxy)-ethyl-diallylammonium chloride
triallylamine hydrochloride
tetraallylammonium chloride General polymerization processes employed in the present invention are explained below.

Every monomer represented by the general Formula I is a solid and therefore, at ordinary temperature, a solid monomer has to be mixed with gaseous sulfur dioxide. Ordinarily, such mixing is extremely difficult. Surprisingly, however, the monomer represented by the general Formula I quite well absorb sulfur dioxide, and therefore the two compounds can be mixed with each other by merely injecting sulfur dioxide directly into the solid monomer. That is, crystals of the monomer are charged into a vessel shielded from light which has been equipped with a stirrer and a gas inlet pipe extending to the bottom of the vessel, and then a sulfur dioxide gas is injected thereinto, whereby the gas is quickly absorbed into the monomer with generation of heat to form a viscous liquid mixture. Alternatively, it is sometimes preferable to mix the two in such a manner that sulfur dioxide in the form of a liquid is added to the monomer with cooling.

A problem encountered in the said mixing is the molar ratio of the monomer to sulfur dioxide. Ideally, this molar ratio is accurately 1:1. In practice, however, it is difficult to bring the molar ratio strictly to 1:1. Generally, in case the amount of sulfur dioxide is smaller than an equimolar amount, the amine monomer is not dissolved but is left in the form of crystals. In case the amount of sulfur dioxide is large, it undesirably remains even after completion of the polymerization. If sulfur dioxide is present in excess, it acts as a solvent and, in a strict sense, no bulk-polymerization takes place. Considering the permissible molar ratio range to be adopted in the mixing operation, however, the molar ratio of the two components in the mixture employed in the present invention is within the range of monomer/$SO_2$=11/10–10/11. Most of the monomers employed in the present invention are very hygroscopic, and therefore it is sometimes difficult to completely remove water at the time of mixing. In such a case, water acts as a solvent and, in a strict sense, no bulk-polymerization is carried out. In the present invention, however, the presence of water in an amount of up to 5% by weight based on the amount of the monomer is permitted.

The thus prepared liquid mixture is ordinarily extruded in the form of a film or sheet, through a slit onto a belt conveyor. In this case, the thickness of the mixture is 0.1 cm.–5 cm., preferably 0.5 cm.–2 cm. Further, in the above case, the whole mixture is sometimes covered in such a manner that the extruded mixture is enveloped with a transparent resin film having no absorption at 300 mμ–450 mμ, such as a polyethylene or polypropylene film, or the mixture is extruded into a belt-like cylinder made of such a resin film.

Subsequently, the thus extruded mixture is irradiated with a light. The optimum wave length of the light to be irradiated somewhat varies depending on the kind of the monomer employed. Generally, however, a light having a wave length of from 300 mμ to 450 mμ, particularly from 350 mμ to 420 mμ, is preferable. Accordingly, sunlight is, of course, usable. Ordinarily, however, a fluorescent lamp capable of emitting a light of such a wave length is used as a light source.

Figure 2:
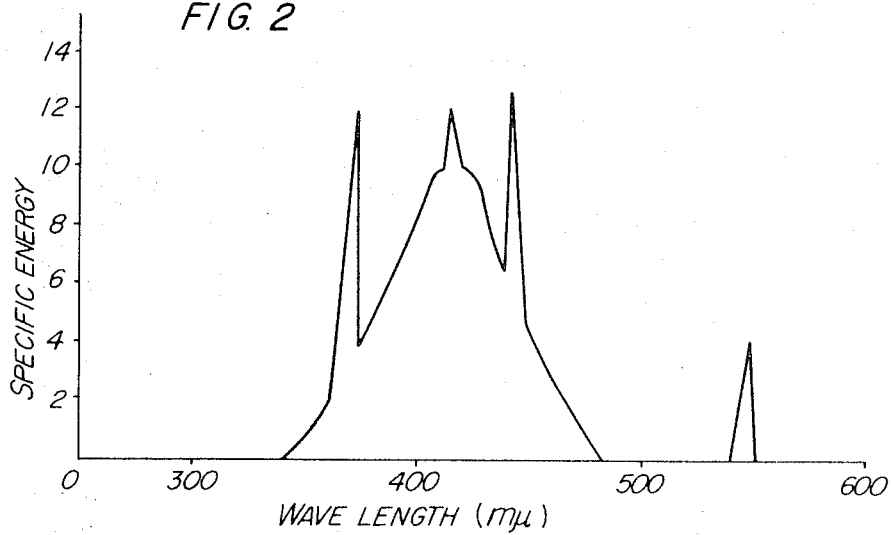

In the accompanying drawings, FIGS. 1 and 2, show wave length distributions of lights from the two fluorescent lamps used in the examples of the present invention.

The amount of the light to be irradiated varies depending on the kind of the amine monomer employed and on the thickness and temperature of the extruded mixture, and hence cannot be generically defined. However, the quantum yield in the polymerization reaction of the present invention is considerably high, and therefore, the polymerization sufficiently progress even when the amount of light is considerably small.

The temperature of the monomer mixture at the time of irradiation is from −100° C. to 100° C., preferably from −50° C. to 50° C. If the temperature is excessively low, the flowability of the mixture is low and the extrusion thereof becomes considerably difficult. However, when a light is irradiated, the temperature of the mixture increases owing to polymerization heat, and therefore the temperature of the mixture at the initiation of irradiation is desirably below 50° C.

As mentioned previously, the amine monomer and sulfur dioxide have considerably strongly bonded to each other, and therefore, even when the temperature is elevated to 100° C. owing to the polymerization heat, no substantial liberation of the sulfur dioxide is observed. Particularly, the surface of the mixture is immediately covered with a film of the polyaminesulfone formed by the polymerization, so that the escape of the sulfur dioxide becomes more difficult.

Generally, the polymerization rate becomes greater and the final conversion becomes higher with an elevation of temperature. However, if the temperature becomes excessively high, the resulting polyaminesulfone is lowered in polymerization degree. Since air disturbs the polymerization, it is desirable that the irradiation atmosphere is substituted by nitrogen, or the mixture is covered with a polyethylene film or the like. Even in air, however, the polymerization proceeds sufficiently.

If the monomer mixture is incorporated with a sensitizer which is employed in ordinary photopolymerization, in some cases, favorable results can be attained. The incorporation of such a sensitizer as 5-nitroacenaphthene is particularly effective. Further, in some cases, the use of a certain kind of radical catalyst increases the yield. For example, benzoyl peroxide is quite well soluble in the monomer mixture even at low temperatures, and therefore, if the peroxide is dissolved in the monomer mixture at a temperature below the decomposition temperature of the peroxide and the resulting solution is irradiated with a light, the temperature of the mixture is elevated owing to the heat generated by photopolymerization, whereby the benzoyl peroxide begins to decompose. There are some cases where such a peroxide as benzoyl peroxide is used as a sensitizer for photopolymerization. Ordinarily, however, benzoyl peroxide does not decompose by application of a light having a wave length of more than 300 mμ, so that, in the present invention, it does not act as a sensitizer.

The bulk-polymer as produced by the polymerization is pulverized, dried under reduced pressure to remove unreacted sulfur dioxide and then put into practical use, in some cases. Usually, however, the bulk-polymer is purified in such a manner that it is dissolved in a suitable solvent such as water or alcohol and the resulting solution is added to a large amount of such a non-solvent as acetone, to precipitate the polymer which is then filtered and dried. Alternatively, there are some cases where an aqueous solution, which has been obtained by dissolving the bulk-polymer in water, adding to the solution a suitable radical catalyst, e.g. ammonium persulfate, to copolymerize unreacted monomer in water and then completing the polymerization, is put into practice.

Polyaminesulfones obtained according to the above-mentioned general processes, are usable for various purposes. Particularly, they are markedly effective as flocculating agent of substances suspended in water, e.g. for the coagulation and precipitation of white liquor in paper-making plants. In addition, they are usable as treating agents for improving wet strength of papers, sizing agents for papers, fixers for sizing agents, soil-conditioner for agriculture and engineering works, anti-static agents for fibers and shaped plastics, fixing agents for improving washing fastness of direct dyes and reactive dyes, high molecular surfactants, curing agents for epoxy resins, curing accelerators for rubbers, fungicides, colloid protecting agents, binding agents for glass fibers, thickeners, photosensitive resins, etc.

The present invention is illustrated in detail below with reference to examples, but the invention is not limited only to these examples.

EXAMPLE 1

5.7 kg. (about 30 moles) of crystals of diethyldiallyl-ammonium chloride were charged into a 10-l., glass-lined reactor, and 1.92 kg. (30 moles) of sulfur dioxide was gradually injected therein. As the result, the sulfur dioxide was absorbed in the diethyl-diallylammonium chloride with vigorous generation of heat to form a liquid equimolar mixture. Stirring was initiated on the way of the injection, which was effected over a period of about 5 hours. During the injection, the temperature was so controlled as not to exceed 80° C., and care was taken so that the reactor was shielded from light. (Under such conditions, the sulfur dioxide cannot escape from the reactor during the injection.) The obtained equimolar mixture of diethyl-diallyl ammonium chloride and sulfur dioxide (the mixture is hereinafter referred to as "Monomer Mixture 1") was subjected to photopolymerization under various conditions as set forth in the following polymerization examples.

POLYMERIZATION EXAMPLE 1

10 g. of Monomer Mixture 1 was charged into a Pyrex glass test tube having an inner diameter of 1.5 cm., and exposed to direct sunlight for 20 minutes from 11 a.m. on a five days in midsummer (August). As soon as the mixture was exposed, polymerization took place with generation of heat and, after 20 minutes, the whole mixture solidified to a glass-like state. After the polymerization, the test tube was broken and the content thereof was dissolved in about 20 cc. of methanol. The obtained transparent solution was charged into a large amount of water, and a precipitate formed was separated by filtration, thoroughly washed with acetone and then dried at 50° C. under reduced pressure to constant weight, whereby about 4.6 g. of a polymer was obtained.

The results of elementary analysis of the polymer were C: 46.28%, H: 7.91%, N: 5.26%, S: 13.36% and Cl: 13.61%.

Further, in the infrared absorption spectrum of this polymer, strong absorptions were found at 1125 cm.$^{-1}$ and 1310 cm.$^{-1}$ due to —$SO_2$—. Furthermore, this polymer was easily soluble in water.

From these results, it was considered that the said polymer was a 1:1 alternating cyclo-copolymer of diethyl-diallylammonium chloride and sulfur dioxide (polyaminesulfone).

The viscosity ($\eta$ inh) of this polyaminesulfone measured in a 1/10 N-aqueous sodium chloride solution was 2.6. ($\eta$ inh=ln $\eta$ rel/C; C=0.5 g. polymer/100 ml. of 1/10 N—NaCl). All the viscosities shown in the following examples are values measured under the above-mentioned conditions.

POLYMERIZATION EXAMPLE 2

10 g. of Monomer Mixture 1 was spread in a thickness of about 3 cm. on a glass plate, and exposed to sunlight under the same conditions as in Polymerization Example 1. In this polymerization, the light was applied not through the glass but directly to the mixture. After the polymerization, the product was treated in the same manner as in Polymerization Example 1 to obtain about 4.1 g. of a polymer. The viscosity $\eta$ inh of this polymer was 2.4.

POLYMERZATION EXAMPLE 3

10 g. of Monomer Mixture 1 was put in a bag made of a low pressure polyethylene film having a thickness of 0.1 mm., was spread in a thickness of about 3 mm. and was exposed to sunlight under the same conditions as in Polymerization Example 1. Thereafter, the same treatments as in Polymerization Example 1 were effected to obtain about 4.7 g. of a polymer. The viscosity $\eta$ inh of this polyaminesulfone was 2.5.

POLYMERIZATION EXAMPLE 4

10 g. of Monomer Mixture 1 was charged into a Pyrex glass, sealable test tube having an inner diameter of 1.5 cm., and cooled to −78° C. Air at the upper portion of the tube was completely replaced by nitrogen, and then the tube was sealed. Subsequently, the temperature was elevated to room temperature, and the mixture was exposed to sunlight under the same conditions as in Polymerization Example 1. Thereafter, the same treatments as in Polymerization Example 1 were effected to obtain about 5.3 g. of a polymer. The viscosity $\eta$ inh of this polyaminesulfone was 2.8.

POLYMERIZATION EXAMPLE 5

100 g. of Monomer Mixture 1 was put in a bag made of a low pressure polyethylene film having a thickness of 0.1 mm., and was spread to the form of a flat sheet having a thickness of about 3 mm., a length of 5 cm. and a width of 6 cm. The sheet was placed at a position immediately below the center of, and distanced by 10 cm. from, a fluorescent lamp A (40 w.; lamp length 120 cm.) having such a wave length distribution as shown in FIG. 1, and exposed to the light from said lamp for 1 hour. Thereafter, the same treatments as in Polymerization Example 1 were effected to obtain about 46 g. of a polymer. The viscosity $\eta$ inh of this polyaminesulfone was 3.1.

POLYMERIZATION EXAMPLE 6

In the same manner as in Polymerization Example 5, 100 g. of Monomer Mixture 1 was put in a polyethylene bag and was spread to the form of a flat sheet. This sheet was placed at a position immediately below the center of, and 10 cm. distant from a fluorescent lamp B (40 W.; lamp length 120 cm.) having such a wave length distribution as shown in FIG. 2, and exposed to the light from said lamp for 1 hour. Thereafter, the same treatments as in Polymerization Example 1 were effected to obtain about 72 g. of a polymer. The viscosity $\eta$ inh of this polyaminesulfone was 2.1.

POLYMERIZATION EXAMPLE 8

In the same manner as in Polymerization Example 5, 100 g. of Monomer Mixture 1 was put in a polyethylene bag and was spread to the form of a flat sheet. This sheet was cooled to −80° C. and then exposed, in the same manner as in Polymerization Example 6, to the light from a fluorescent lamp B for 1 hour. Thereafter, the same treatments as in Polymerization Example 1 were effected to obtain about 36 g. of a polymer. The viscosity $\eta$ inh of this polyaminesulfone was 3.3.

POLYMERIZATION EXAMPLE 9

100 g. of Monomer Mixture 1 was thoroughly mixed with 0.1 g. of 5-nitroacenaphthene. In the same manner as in Polymerization Example 5, the resulting mixture was put in a polyethylene bag and spread in the form of a flat sheet, which was then exposed to the light of a fluorescent lamp A for 15 minutes. Thereafter, the same treatments as in Polymerization Example 1 were effected to obtain about 72 g. of a polymer. The viscosity $\eta$ inh of this polyaminesulfone was 3.4.

POLYMERIZATION EXAMPLE 10

100 g. of Monomer Mixture 1 was mixed with 0.2 g. of benzoyl peroxide and was then exposed, in the same manner as in Polymerization Example 6, to the light from a fluorescent lamp B. Thereafter, the same treatments as in Polymerization Example 1 were effected to obtain about 74 g. of a polymer. The viscosity $\eta$ inh of this polyaminesulfone was 3.0.

POLYMERIZATION EXAMPLE 11

In the same manner as in Polymerization Example 6, 100 g. of Monomer Mixture 1 was polymerized by use of a fluorescent lamp B, and the resulting bulk polymerization product was dissolved in 250 g. of water. To this solution was added a solution of 1.5 g. of ammonium persulfate in 50 g. of water, and the mixture was polymerized with stirring at 30° C. for 5 hours. After the polymerization, the odor of sulfur dioxide completely disappeared and a viscous transparent aqueous polymer solution was obtained. (Ordinarily, this solution is put into practical use as it is.) Thereafter, the aqueous solution was charged into a large amount of acetone, and a precipitate deposited was separated by filtration and then dried to obtain 95 g. of a polymer. The viscosity $\eta$ inh of this polyaminesulfone was 2.4

POLYMERIZATION EXAMPLE 12

In the same manner as in Polymerization Example 6, 100 g. of Monomer Mixture 1 was polymerized by use of a fluorescent lamp B, and the resulting bulk polymerization product was dissolved in 200 g. of methanol. To this solution was added 2 g. of ammonium persulfate, and the resulting mixture was polymerized with stirring at 30° C. After 24 hours, the odor of sulfur dioxide completely disappeared, and an extremely viscous transparent polymer solution was obtained. This solution was charged into a large amount of acetone, and a precipitate deposited was separated by filtration and then dried to obtain 93 g. of a polymer. The viscosity $\eta$ inh of this polyaminesulfone was 3.1.

POLYMERIZATION EXAMPLE 13

Monomer Mixture 1 was continuously extruded on a belt conveyor through a slit of 300 mm. x 3 mm., and was continuously irradiated with lights from 50 fluorescent lamps, which had been positioned at 10 cm. intervals 15 cm. above the belt conveyor. The speed of the conveyor was so controlled that the irradiation time became 45 minutes, and the resulting glass-like polymer in the form of a sheet was continuously taken up from the conveyor. The obtained bulk polymerization product was treated in the same manner as in Polymerization Example 1 or 11 to obtain a polyaminesulfone.

POLYMERIZATION EXAMPLE 14

Monomer Mixture 1 was thoroughly mixed with 1/200 the weight of said mixture of triallylamine hydrochloride, and the resulting mixture was polymerized in the same manner as in Polymerization Example 13 to obtain a polyaminesulfone. The polyaminesulfone obtained in this example was higher in viscosity than that obtained in Polymerization Example 13.

EXAMPLE 2

In the same manner as in Example 1, 175 g. of methylethyl-diallylammonium chloride was mixed with 64 g. of sulfur dioxide to prepare a viscous oily mixture. This mixture was subjected to the same bulk-photopolymerization as in Polymerization Example 6 to obtain 160 g. of a polyaminesulfone. The polyaminesulfone was a 1:1 alternating copolymer of methylethyl-diallylammonium chloride and sulfur dioxide and the viscosity $\eta$ inh thereof was 2.7.

EXAMPLE 3

In the same manner as in Example 1, 217 g. of di-n-propyl-diallylammonium chloride was mixed with 64 g. of sulfur dioxide to prepare a viscous oily mixture. This mixture was subjected to the same bulk-photopolymerization as in Polymerization Example 6 to obtain 180 g. of a polyaminesulfone. The viscosity $\eta$ inh of this polyaminesulfone was 3.1.

EXAMPLE 4

162 g. of dimethyl-diallylammonium chloride was mixed with 64 g. of liquid sulfur dioxide cooled to $-40°$ C. The resulting oily mixture was subjected to the same bulk-photopolymerization as in Polymerization Example 6. As soon as the polymerization was initiated, the whole mixture became turbid. After the polymerization, the polymerization product was pulverized, was thoroughly washed with methanol and was then dried under reduced pressure to obtain 56 g. of a polyaminesulfone. As the result of analysis, it was found that the obtained polyaminesulfone was a 1:1 alternating copolymer of dimethyl-diallylammonium chloride and sulfur dioxide, and the viscosity $\eta$ inh thereof was 0.65.

EXAMPLE 5

In the same manner as in Example 1, 238 g. of methylbenzyl-diallylammonium chloride was mixed with 64 g. of sulfur dioxide to prepare a viscous oily mixture. This mixture was subjected to the same bulk-photopolymerization as in Polymerization Example 6 to obtain 205 g. of a polyaminesulfone. As the result of analysis, it was found that the obtained polyaminesulfone was a 1:1 alternating copolymer of methylbenzyl-diallylammonium chloride and sulfur dioxide, and the viscosity $\eta$ inh thereof was 2.2.

EXAMPLE 6

In the same manner as in Example 1, 190 g. of tert-butyl-diallylamine hydrochloride was mixed with 64 g. of sulfur dioxide to prepare a viscous mixture. This mixture was subjected to the same bulk-photopolymerization as in Polymerization Example 6 to obtain 185 g. of a polyaminesulfone. As the result of analysis, it was found that the polyaminesulfone was a 1:1 alternating copolymer of tert-butyl-diallylamine hydrochloride and sulfur dioxide, and the viscosity $\eta$ inh thereof was 2.8.

EXAMPLE 7

In the same manned as in Example 1, 178 g. of 2-hydroxyethyl-diallylamine hydrochloride was mixed with 64 g. of sulfur dioxide to prepare a viscous mixture. This mixture was subjected to the same bulk-photopolymerization as in Polymerization Example 6 to obtain 184 g. of a polyaminesulfone. The polyaminesulfone was a 1:1 alternating copolymer of 2-hydroxyethyl-diallylamine hydrochloride and sulfur dioxide, and the viscosity $\eta$ inh thereof was 2.9.

What we claim is:

1. A process for producing polyaminesulfones consisting of repeating units represented by the general formula:

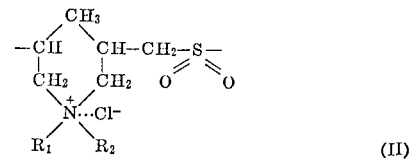

(II)

wherein $R_1$ and $R_2$ are hydrogen atoms, allyl groups, straight or branched-chain alkyl groups having 1–16 carbon atoms, aralkyl groups or hydroxyalkyl groups of the formula, $HO\text{-}(CH_2)_m$, where $m$ is 1 to 6, which comprises subjecting to bulk-photocopolymerization by irradiation with a light containing rays having a wave length of 300–450 m$\mu$ a substantially equimolar mixture of sulfur dioxide and a compound represented by the general formula:

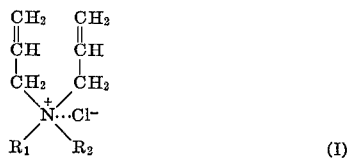

wherein $R_1$ and $R_2$ are the same as defined above, said mixture being substantially free of solvents.

2. A process according to claim 1, wherein the molar ratio of the compound represented by the general Formula I to sulfur dioxide is in the range of from 11:10 to 10:11.

3. A process according to claim 1, wherein the mixture is prepared by injecting sulfur dioxide at ordinary temperature into a solid compound of the general Formula I.

4. A process according to claim 1, wherein the mixture is prepared by adding liquid sulfur dioxide with cooling to a compound of the general Formula I.

5. A process according to claim 1, wherein the light is sunlight.

6. A process according to claim 1, wherein the light is a light from a fluorescent lamp.

7. A process according to claim 1, wherein the temperature of the mixture at the time of irradiation is in the range of from —100° C. to +100° C.

8. A process according to claim 1, wherein the temperature of the mixture at the time of irradiation is in the range of from —50 ° C. to +50° C.

9. A process according to claim 1, wherein the mixture is in the form of a film or sheet.

10. A process according to claim 9, wherein the thickness of the film or sheet of mixture is in the range of from 0.1 cm. to 5 cm.

11. A process according to claim 10, wherein the thickness is in the range of from 0.5 cm. to 2 cm.

12. A process according to claim 9, wherein the film or sheet of mixture is covered with a transparent film of a resin having no absorption at 300 m$\mu$ to 450 m$\mu$.

13. A process according to claim 12, wherein the transparent film is of polyethylene or polypropylene.

14. A process according to claim 1, wherein the mixture is incorporated with a sensitizer.

15. A process accordinng to claim 14, wherein the sensitizer is 5-nitroacenaphthene.

16. A process according to claim 1, wherein the mixture is incorporated with a radical catalyst.

17. A process according to claim 16, wherein the radical catalyst is benzoyl peroxide.

18. A process according to claim 1, wherein the bulk-polymer obtained is dissolved in water, a suitable radical catalyst is added to the resulting solution and the resulting mixture is heated to polymerize the unreacted monomer contained therein.

References Cited
UNITED STATES PATENTS

| | | | |
|---|---|---|---|
| 3,386,971 | 6/1968 | Gardner et al. | 204—59.22 |
| 3,375,233 | 3/1968 | Harada et al. | 260—79.3M |

MURRAY TILLMAN, Primary Examiner

R. B. TURER, Assistant Examiner

U.S. Cl. X.R.

117—93.31, 138.8R, 138.8E; 162—169; 204—159.23; 260—79.3R, 79.3M, 836, 837R, 887